(12) United States Patent
Oyori (10) Patent No.: US 6,759,818 B2
(45) Date of Patent: Jul. 6, 2004

(54) ELECTROMOTIVE ACTUATOR AND METHOD FOR CONTROLLING THE SAME

(75) Inventor: Hitoshi Oyori, Tokyo (JP)

(73) Assignee: IHI Aerospace Co., Ltd., Tokyo (JP)

( * ) Notice: Subject to any disclaimer, the term of this patent is extended or adjusted under 35 U.S.C. 154(b) by 0 days.

(21) Appl. No.: 10/158,004

(22) Filed: May 31, 2002

(65) Prior Publication Data

US 2002/0195978 A1 Dec. 26, 2002

(30) Foreign Application Priority Data

Jun. 1, 2001 (JP) .......................................... 2001-167229
Aug. 1, 2001 (JP) .......................................... 2001-233298
Sep. 5, 2001 (JP) .......................................... 2001-268772

(51) Int. Cl.$^7$ .............................. H02P 5/46; H02P 7/68; H02P 7/74
(52) U.S. Cl. ............................... 318/34; 318/5; 318/8; 318/39
(58) Field of Search ........................... 318/564, 34, 563, 318/35, 5, 37, 38, 85, 113, 77, 8, 39, 630, 625; 408/138, 153, 182, 183, 64, 100, 129; 29/47

(56) References Cited

U.S. PATENT DOCUMENTS 6,309,203 B1 * 10/2001 Tamaki et al. ............... 425/145
6,459,169 B1 * 10/2002 Onodera ..................... 307/10.1

FOREIGN PATENT DOCUMENTS

| JP | 55137856 A | * 10/1980 | ............ B23Q/3/18 |
| JP | 59193042 A | * 11/1984 | ............ H01L/21/68 |
| JP | 62009924 A | * 1/1987 | ............ B29C/45/20 |
| JP | 05256359 A | * 10/1993 | ............ F16H/61/32 |

* cited by examiner

Primary Examiner—Robert Nappi
Assistant Examiner—Eduardo Colon Santana
(74) Attorney, Agent, or Firm—Sughrue Mion, PLLC

(57) ABSTRACT

To realize structure simplification and reduction in manufacturing cost without lowering power transmission efficiency and reliability. The present invention includes a first motor 5 and a second motor 6, and a lead 2 of a ball screw 12 is disposed coaxially with a motor rotary shaft 5a on a first motor 5 side and a nut 3 of the ball screw 12 is disposed coaxially with a motor rotary shaft 6a on a second motor 6 side so that the first motor 5 and the second motor 6 are connected to each other via the ball screw 12.

8 Claims, 10 Drawing Sheets

ELECTROMOTIVE ACTUATOR AND METHOD FOR CONTROLLING THE SAME

BACKGROUND OF THE INVENTION

1. Field of the Invention

The present invention relates to an electromotive actuator for use in operating, for example, a movable nozzle of a rocket and to a method for controlling the same.

2. Description of Related Art

Figure 6:
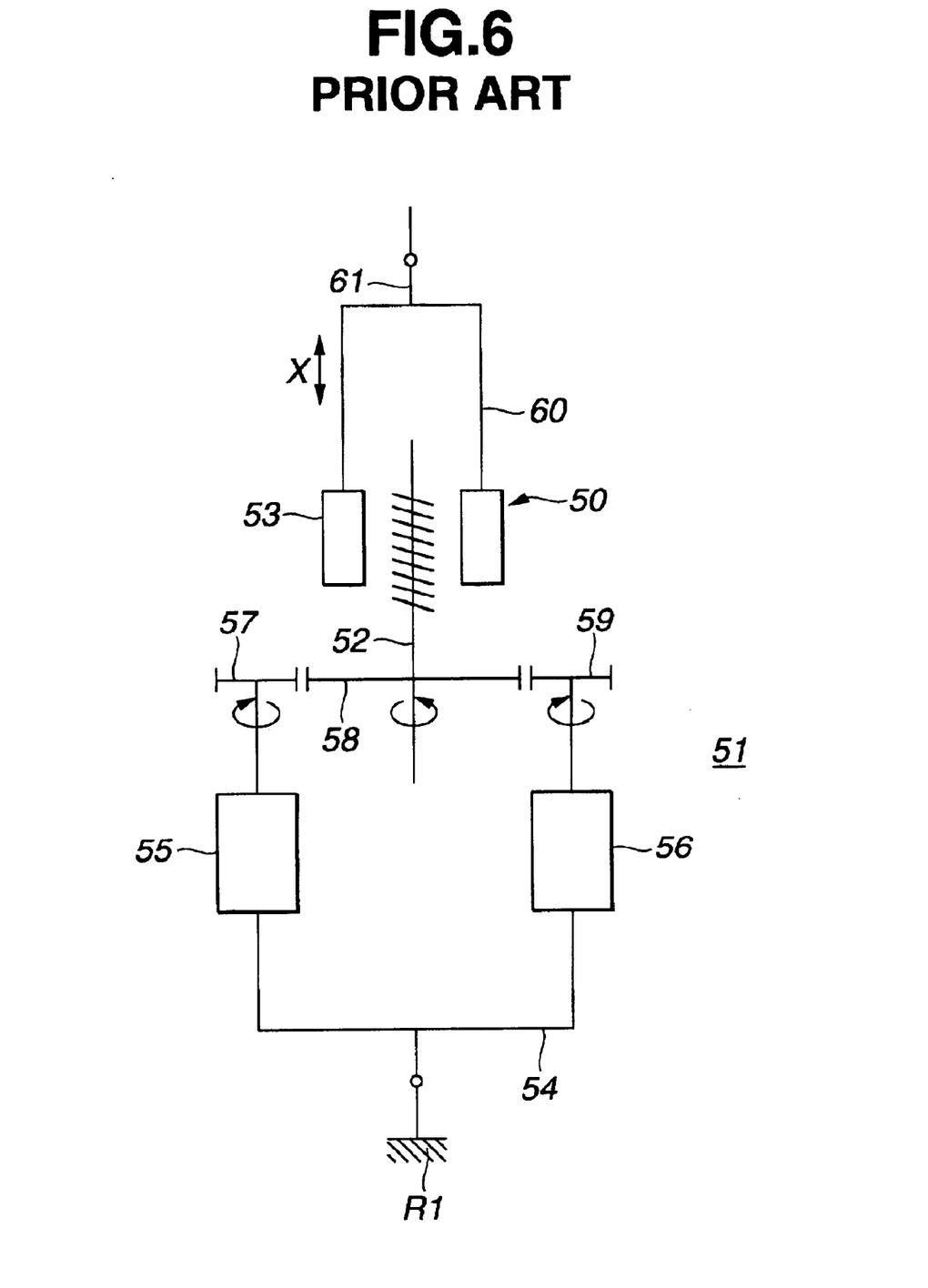
FIG. 6 is an explanatory block diagram showing an electromotive actuator in a prior art.

Conventionally, as such an electromotive actuator as mentioned above, there is, for example, an electromotive actuator 51 which, as shown in FIG. 6, includes: a first motor 55 and a second motor 56 accommodated in a parallel state to each other in a housing 54 which is pivotally connected to a fuselage R1; a ball screw 50 disposed in parallel to the first motor 55 and the second motor 56; a third gear 58 attached to a lead 52 of this ball screw 50 and simultaneously engaged both with a first gear 57 and a second gear 59 which are attached to respective output shafts of the first motor 55 and the second motor 56; and an arm 61 attached coaxially with the lead 52 to a housing 60 which is integrally structured with a nut 53 of the ball screw 50.

This electromotive actuator 51 is so structured that, for example, when the first motor 55 is malfunction, the lead 52 of the ball screw 50 is driven only with the second motor 56 to move the arm 61 together with the housing 60 in an arrow X direction.

Figure 7:
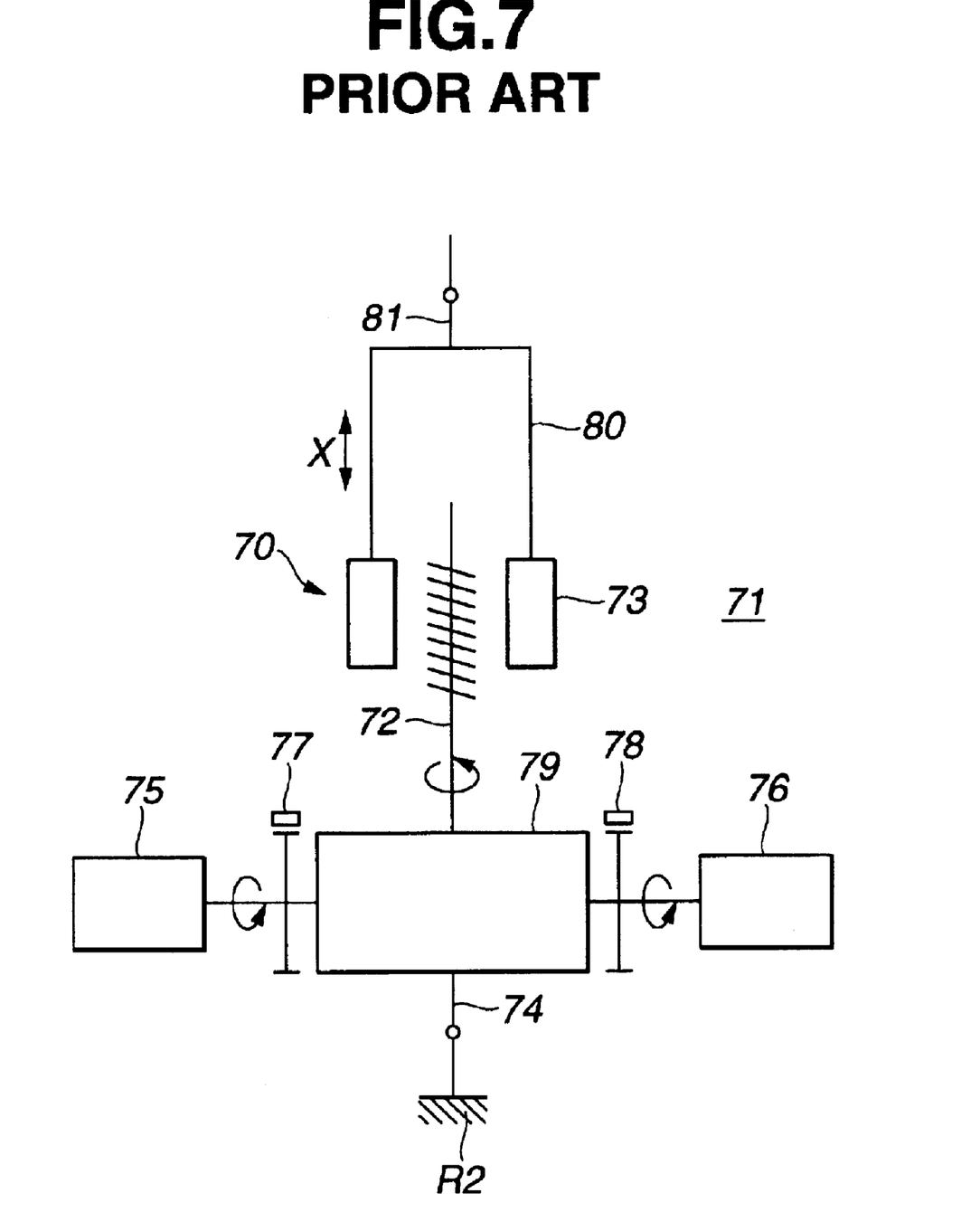
FIG. 7 is an explanatory block diagram showing another electromotive actuator in the prior art.

As another electromotive actuator different from this electromotive actuator 51, there is an electromotive actuator 71 which, as shown in FIG. 7, includes: a first motor 75 and a second motor 76 accommodated in a coaxial state with each other in a housing 74 which is pivotally connected to a fuselage R2; a ball screw 70 disposed perpendicularly to the first motor 75 and the second motor 76; a differential gear array 79 which connects respective output shafts of the first motor 75 and the second motor 76 to a lead 72 of this ball screw 70; and an arm 81 attached coaxially with the lead 72 to a housing 80 which is integrally structured with a nut 73 of the ball screw 70, and in the first motor 75 and the second motor 76, a first brake 77 and a second brake 78 for restricting the rotations of the respective output shafts are provided.

This electromotive actuator 71 is so structured that, for example, when the first motor 75 is malfunction, the first brake 77 brakes the output shaft of the first motor 75 and the lead 72 of the ball screw 70 is driven only with the second motor 76 to move the arm 81 together with the housing 80 in an arrow X direction.

Figure 8:
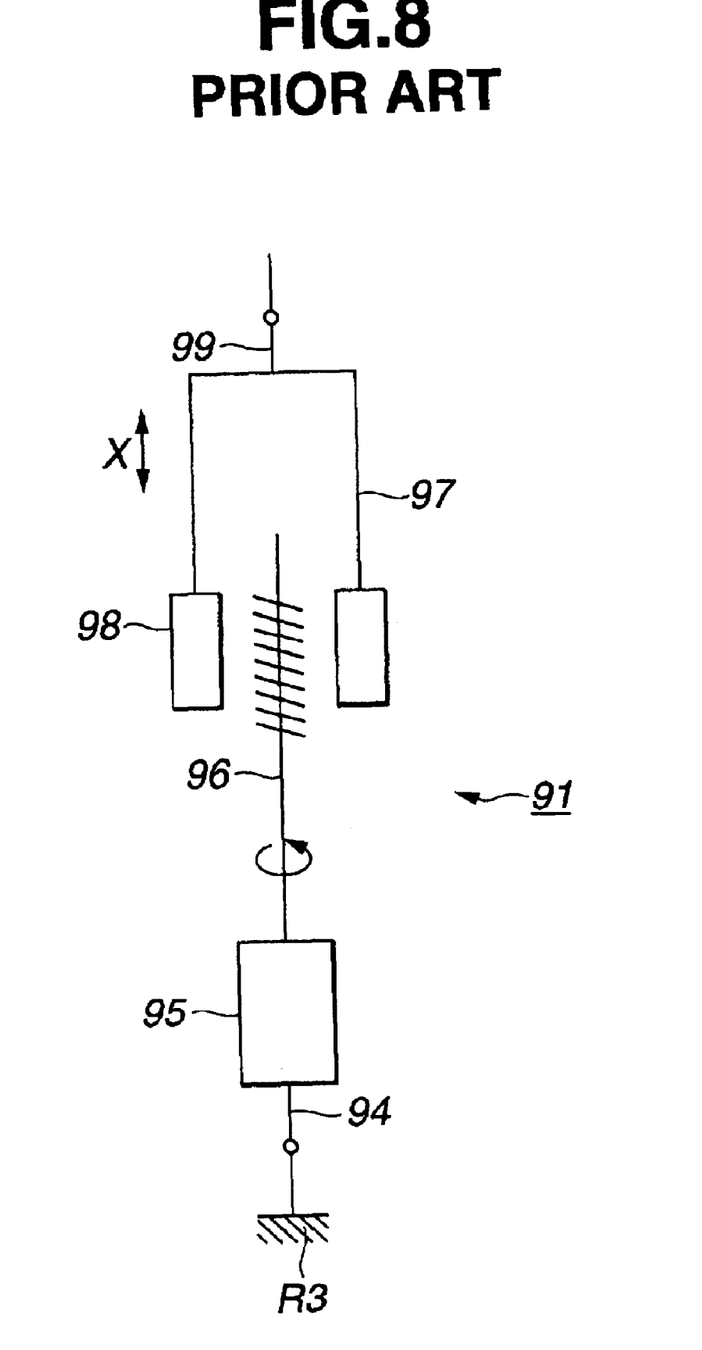
FIG. 8 is an explanatory block diagram showing still another electromotive actuator in the prior art.

Furthermore, as another electromotive actuator different from the electromotive actuators 51, 71 described above, there is an electromotive actuator 91 which, as shown in FIG. 8, includes: a motor 95 accommodated in a housing 94 which is pivotally connected to a fuselage R3; a lead 96 of a ball screw disposed coaxially with this motor 95; a nut 98 of the ball screw integrally structured with a housing 97 which is coaxially disposed with the motor 95; and an arm 99 which is positioned on a side of the housing 97 opposite the nut 98 and which is coaxial with the motor 95, and this electromotive actuator 91 is so structured that the arm 99 is moved in an arrow X direction together with the housing 97 by rotating the motor 95.

Figure 10:
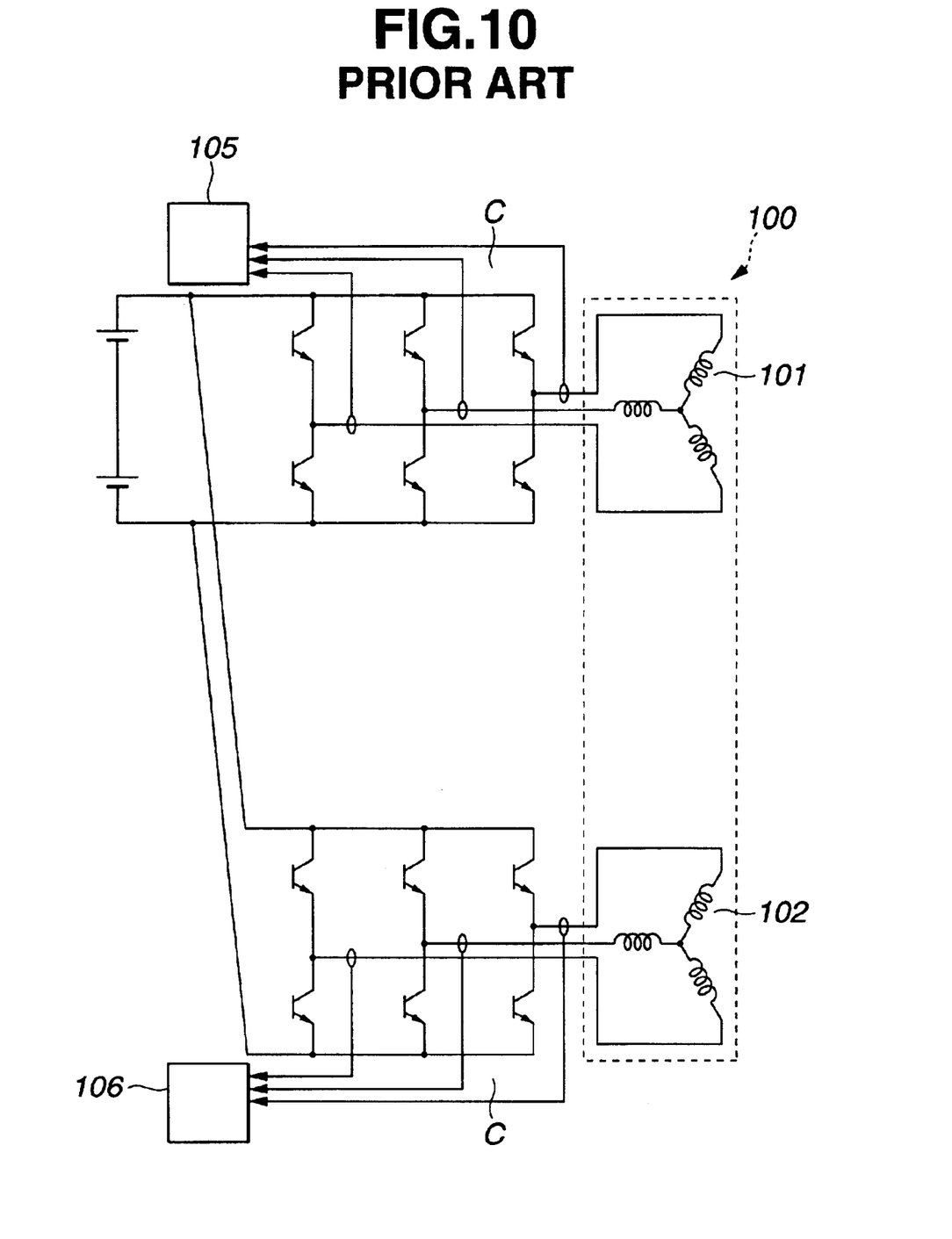
FIG. 10 is an explanatory circuit diagram showing a multiphase motor in the prior art.

In this case, as a multiphase motor used in the above-described electromotive actuators 51, 71, 91, there is, for example, a three-phase brushless motor 100 which is, as shown in FIG. 10, provided with totally two sets of windings 101, 102 of an A system and a B system. The windings 101, 102 of this three-phase brushless motor 100 are both connected to inverters C, C respectively and electric currents flowing through the two sets of the windings 101, 102 are feedback to interface circuits 105, 106 via these inverters C, C respectively to perform electric current control.

In the above-described electromotive actuators, however, the electromotive actuator 51 shown in FIG. 6 has a problem that efficiency of the electromotive actuator 51 is lowered due to an inertia load of the first motor 55 when the first motor 55 is malfunction and only the second motor 56 is operated.

Moreover, in order to prevent the influence of the inertia load of the first motor 55, a clutch mechanism becomes necessary, and there exists a problem that reliability of a power transmission system of the electromotive actuator 51 is lowered.

The electromotive actuator 71 shown in FIG. 7 has a problem that, since its mechanism system is relatively complicated, reliability cannot be said to be high, and in addition, manufacturing cost may possibly be increased.

Figure 9:
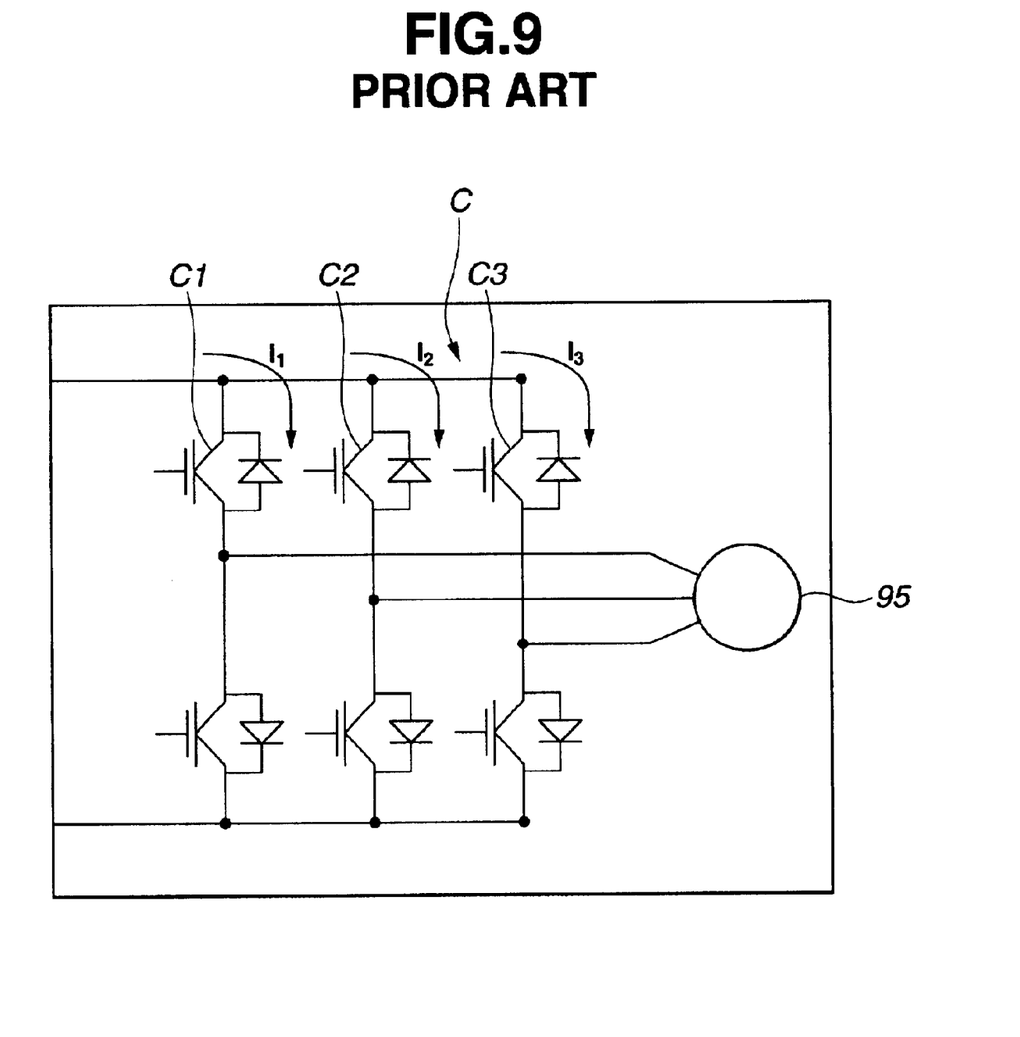
FIG. 9 is an explanatory circuit diagram showing an inverter of the electromotive actuator in FIG. 8.

Furthermore, in the electromotive actuator 91 shown in FIG. 8, when the arm 99 is fixed in a predetermined position while the motor 95 is burdened with a load, the position is maintained by a positioning servo based on a feedback signal from a not-shown position sensor, so that electric currents are concentrated to a power transistor for fixing (for example, a transistor C1) of an inverter C, as shown in FIG. 9, to increase heat generation due to a resistance loss of this power transistor C1, and therefore, there exists a problem that it cannot be said that there is no possibility that the inverter C is damaged.

Meanwhile, in the conventional three-phase brushless motor 100 used in the above-described electromotive actuators 51, 71, 91, when, for example, the set of the windings 101 or the inverter C of the A system has a trouble, the three-phase brushless motor 100 operates only with the remaining set of the windings 102 of the B system since the two sets of the windings 101, 102 are independent from each other, but there exists a problem that its output power is reduced by half.

Moreover, there exists problems that, when even one phase out of three phases becomes out of order in the remaining set of the windings 102 of the B system, an inoperable state is caused, and in addition, the damage of one phase induces the damage of the other phases when the inverters C, C are out of order in a normal short-circuit mode. Therefore, solving these problems has been a conventional object.

The present invention is made in view of the above-described conventional problems, and an object of an invention according to claim 1 and claim 2 is to provide an electromotive actuator which can realize structure simplification and reduction in manufacturing cost without lowering power transmission efficiency and reliability; an object of an invention according to claim 3 and claim 4 is to provide an electromotive actuator and a method for controlling the electromotive actuator which can reduce a resistance loss of a power transistor, and in addition, can realize uniform thermal distribution, and as a result, can downsize an inverter and enhance reliability; and an object of an invention according to claim 5 and claim 6 is to provide a multiphase motor and a method for controlling the same which can not only prevent an inoperable state but also suppress decrease in output power even when an inverter is malfunction or one phase out of multi-phases of windings has a trouble, and in addition, which can almost eliminate the possibility that the damage of one phase induces the damage of the other phases when the inverter is out of order in a normal short-circuit mode.

SUMMARY OF THE INVENTION

An electromotive actuator according to claim 1 of the present invention comprises a first motor and a second motor, and is characterized in the structure that a lead of a ball screw is disposed coaxially with a motor rotary shaft on a side of one motor out of the first motor and the second motor and a nut of the ball screw is disposed coaxially with the motor rotary shaft on a side of the other motor out of the first motor and the second motor, thereby connecting the first motor and the second motor to each other via the ball screw. This structure of the electromotive actuator is adopted as means for solving the conventional problems described above.

An electromotive actuator according to claim 2 of the present invention is so structured that a lead brake for restricting the rotation of the lead of the ball screw is disposed on the side of one motor out of the first motor and the second motor and a nut brake for restricting the rotation of the nut of the ball screw is disposed on the side of the other motor out of the first motor and the second motor.

An electromotive actuator according to claim 3 of the present invention comprises a first motor, a second motor, and an operating section, and is characterized in the structure that a speed adding/outputting mechanism, which is connected to both of respective rotary shafts of both of the motors, for outputting a speed difference between both of the motors to the operating section is disposed between the first motor and the second motor, and that the speed difference between both of the motors is eliminated by constantly rotating both of the first motor and the second motor in the same phase to enable a fixed state of the operating section to be maintained. This structure of the electromotive actuator is adopted as means for solving the conventional problems described above.

A method for controlling an electromotive actuator according to claim 4 of the present invention is characterized in the structure that, in the electromotive actuator according to claim 3, the fixed state of the operating section is maintained by constantly rotating both of the first motor and the second motor in the same phase to eliminate the speed difference between both of the motors. This structure of the method for controlling the electromotive actuator is adopted as means for solving the conventional problems described above.

An invention according to claim 5 of the present invention is a multiphase motor which is a motor used in the electromotive actuators according to claim 1 to claim 3, comprising two sets of windings connected to inverters respectively, and it is characterized in the structure that, in the multiphase motor performing electric current control by feeding back electric currents flowing through the two sets of the windings respectively, a neutral line connected both to a neutral point of a star connection in one of the sets of the windings and a neutral point of a star connection in the other one of the sets of the windings is provided. This structure of the multiphase motor is adopted as means for solving the conventional problems described above.

A method for controlling a multiphase motor according to claim 6 of the present invention is characterized in the structure that, in the multiphase motor according to claim 5, when a failure occurs in one of phases of one of the two sets of the windings, electric current control is performed in such a manner that a substantially doubled electric current is made to flow through a phase of the other one of the sets of the windings, which is a counterpart of the phase in which this failure occurs. This structure of the method for controlling the multiphase motor is adopted as means for solving the conventional problems described above.

Since the electromotive actuator according to claim 1 of the present invention has the above-described structure, the movement of the ball screw corresponds to the sum of a rotation angle of the first motor and a rotation angle of the second motor and the redundancy of the speed sum is structured so that, for example, even when the operation of the first motor is stopped, an inertia load of this first motor does not become a load on the second motor, and thereby, degradation in power transmission efficiency is avoided.

In the electromotive actuator according to claim 2 of the present invention, when, for example, the first motor stops due to its failure, by braking the motor rotary shaft of this first motor, a drive operation can be performed only with the second motor without being influenced by the inertia load of the first motor which has stopped, though the speed is reduced by half.

Since the electromotive actuator according to claim 3 of the present invention has the above-described structure, when the fixed state of the operating section is maintained, a resistance loss of one power transistor becomes one third of that in a prior art by rotating the first motor and the second motor in the same phase so that heat generation due to the resistance loss of the power transistor is suppressed to be small.

Since the method for controlling the electromotive actuator according to claim 4 of the present invention has the above-described structure, the resistance loss of the power transistor in maintaining the fixed state of the operating section is suppressed to one third of that in a prior art, and as a result, downsizing and reliability enhancement of an inverter are realized.

The multiphase motor according to claim 5 of the present invention has the above-described structure, and therefore, in a case when the multiphase motor is, for example, a three-phase motor, when a failure in a short-circuit mode occurs in an inverter of a U-phase of one of the sets of the windings, a short-circuit electric current flows through the neutral line and does not flow to other elements, and the electric current control using the neutral line is performed in the remaining set of the windings. Consequently, almost no influence of the damage of the U-phase of one of the sets of the windings is given to the other phases, and in this case, control for automatically compensating for the electric current loss in the U-phase can be performed so that a great decrease in output power can also be suppressed.

In the method for controlling the multiphase motor according to claim 6 of the present invention, in a case when the multiphase motor is, for example, a three-phase motor, even when the inverter of the U-phase in one of the sets of the windings has a failure, a substantially doubled electric current is caused to flow through a U'-phase of the other one of the sets of the windings, which is a counterpart of this U-phase, thereby controlling to have the U'-phase automatically compensate for the loss in the U-phase so that the decrease in output power is suppressed to be small.

DETAILED DESCRIPTION OF THE PREFERRED EMBODIMENTS

The present invention will be explained below based on the drawings.

Figure 1:
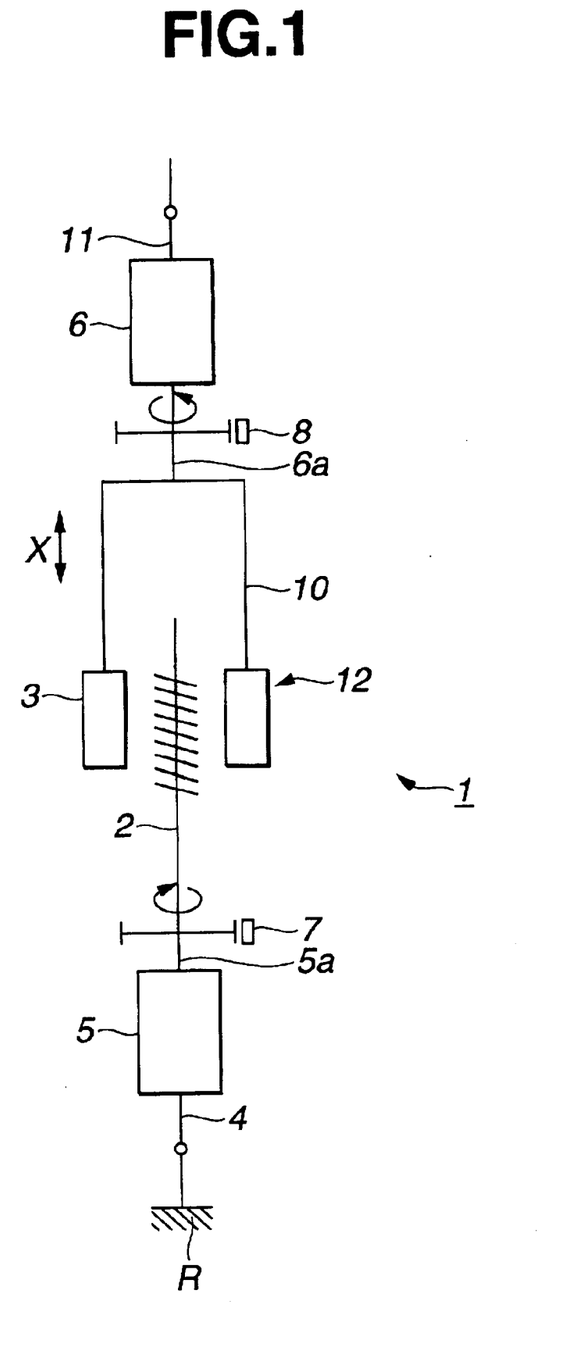
FIG. 1 is an explanatory block diagram showing one embodiment of an electromotive actuator according to the present invention.
Figure 2A:
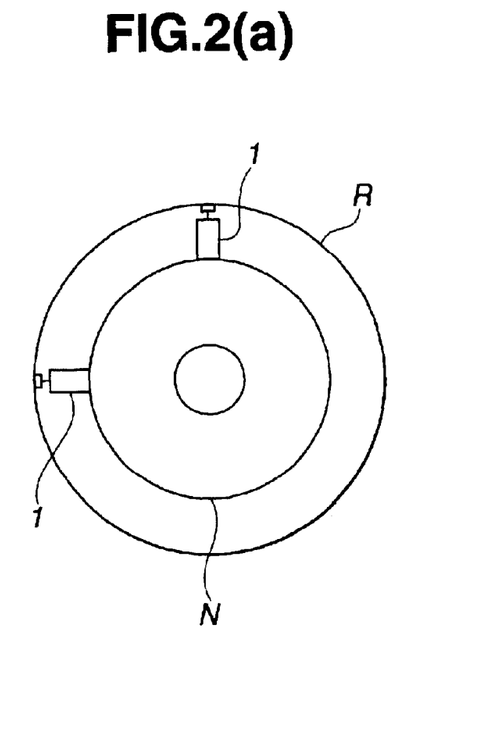
FIG. 2(a) is an explanatory bottom view and FIG. 2(b) is an explanatory side view of a fragmentary section showing the state in which the electromotive actuator in FIG. 1 is adopted as a drive source of a movable nozzle of a rocket.
Figure 2B:
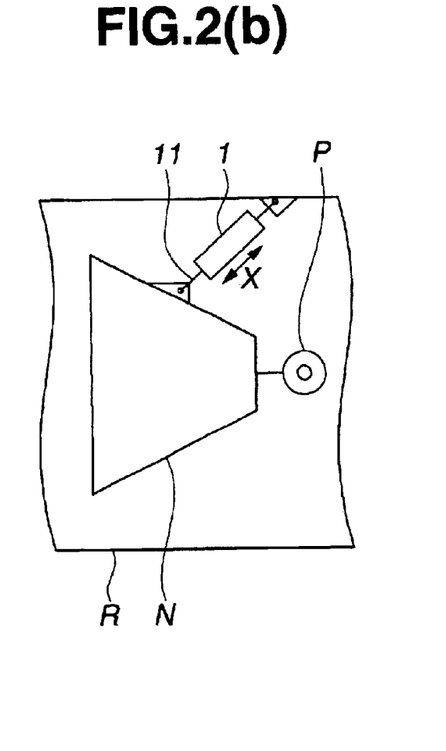

FIG. 1 and FIG. 2 show an embodiment of an electromotive actuator according to the present invention, and in this embodiment, a case when the electromotive actuator according to the present invention is an electromotive actuator for use in operating a movable nozzle of a rocket is shown.

As shown in FIG. 1, this electromotive actuator 1 includes a first motor 5 accommodated in a housing 4 which is pivotally connected to a fuselage R, a second motor 6 disposed coaxially with this first motor 5, a lead 2 of a ball screw 12 coaxially attached to a motor rotary shaft 5a of the first motor 5, a nut 3 of the ball screw 12 integrally structured with a housing 10 which is coaxially attached to a rotary shaft 6a of the second motor 6, and an arm 11 attached to the second motor 6 coaxially with the motor rotary shaft 6a, and the electromotive actuator 1 is so structured that the first motor 5 and the second motor 6 connected to each other via the ball screw 12 are rotated to move the arm 11 together with the housing 10 and the second motor 6 in an arrow X direction.

In this case, a lead brake 7 for restricting the rotation of the lead 2 of the ball screw 12 is disposed on a first motor 5 side and a nut brake 8 for restricting the rotation of the nut 3 of the ball screw 12 is disposed on a second motor 6 side.

As shown in FIG. 2, two of the electromotive actuators 1 are disposed, with a spaced interval of 90° therebetween, between a tail part of a fuselage R of the rocket and a movable nozzle N supported steering on a pivot P in the tail part of this fuselage R, and these electromotive actuators 1 are operated when necessary to move the arms 11 in an arrow X direction respectively so that the angle of the movable nozzle N is controlled.

As described above, this electromotive actuator 1 has a so-called redundancy of the speed sum, and in its normal operation state, the movement of the ball screw 12 corresponds to the sum of the rotation angles of the first motor 5 and the second motor 6.

In this electromotive actuator 1, for example, when the first motor 5 is out of order, the lead brake 7 restricts the rotation of the motor rotary shaft 5a of the first motor 5 and the movable nozzle N is driven only with the second motor 6.

Meanwhile, when the second motor 6 is out of order, the nut brake 8 restricts the rotation of the motor rotary shaft 6a of the second motor 6, and the movable nozzle N is driven only with the first motor 5.

Therefore, in the electromotive actuator 1 according to this embodiment, when the motor 5 (or the other motor 6) out of these motors is stopped, the drive operation can be performed only with the other motor 6 (or the motor 5) without being influenced by an inertia load of the stopped motor 5 (or the other motor 6), though the speed is reduced by half. Consequently, high transmission efficiency is maintained, and in this case, the structure is also simplified so that degradation in transmission efficiency and reliability is prevented.

Figure 3:
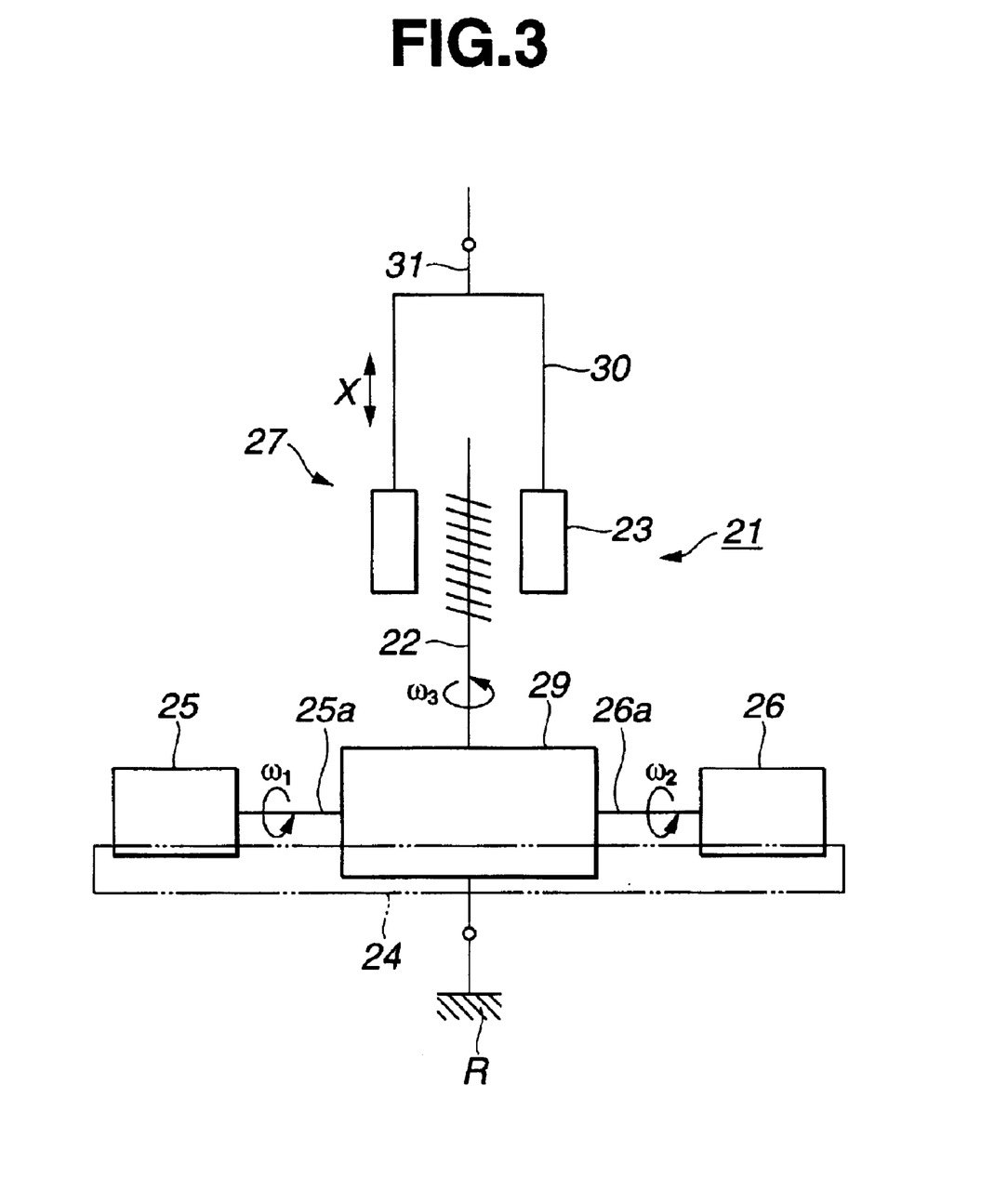
FIG. 3 is an explanatory block diagram showing another embodiment of the electromotive actuator according to the present invention.

FIG. 3 shows another embodiment of an electromotive actuator according to the present invention, and also in this embodiment, a case in which the electromotive actuator according to the present invention is an electromotive actuator for use in operating the movable nozzle of the rocket is shown.

As shown in FIG. 3, this electromotive actuator 21 includes: a first motor 25 and a second motor 26 accommodated in a housing 24 which is pivotally connected to the fuselage R, being coaxial with and opposite to each other; a ball screw 27 disposed perpendicularly to the first motor 25 and the second motor 26; a differential gear mechanism (a speed adding/outputting mechanism) 29 which is connected to a lead 22 of this ball screw 27 and also connected to both of respective rotary shafts 25a, 26a of the first motor 25 and the second motor 26; and an arm (an operating section) 31 attached coaxially with the lead 22 to a housing 30 which is integrally structured with a nut 23 of the ball screw 27, and this electromotive actuator 21 is so structured that a speed difference $\omega_3$ between a speed $\omega_1$ of the first motor 25 and a speed $\omega_2$ of the second motor 26 $(=\omega_1-\omega_2)$ is outputted from the differential gear mechanism 29 to the ball screw 27 so that the arm 31 is moved together with the housing 30 in an arrow X direction.

In this case, the same-phase rotations at a speed a are constantly given as bias speeds to both of the first motor 25 and the second motor 26 respectively.

Similarly to the electromotive actuator 1 in the previous embodiment, two of the electromotive actuators 21 are also disposed, with a spaced interval of 90° therebetween, between the tail part of the fuselage R of the rocket and the movable nozzle N steering supported on the pivot P, and these electromotive actuators 21 are operated when necessary to move the arms 31 in the arrow X direction respectively so that the angle of the movable nozzle is controlled (refer to FIG. 2).

In the electromotive actuator 21 as structured above, when the position of the movable nozzle N is maintained, in other words, when the arm 31 is not moved and the length of this electromotive actuator 21 is fixedly maintained, only the same-phase rotations at the speed α which are constantly given both to the first motor 25 and the second motor 26 are performed continuously so that the speed difference $\omega_3$ between the speed $\omega_1$ of the first motor 25 and the speed $\omega_2$ of the second motor 26 becomes zero, and consequently, the ball screw 27 does not rotate and a fixed state of the arm 31 is maintained as shown in Table 1.

TABLE 1

|  | first motor speed ($\omega_1$) | second motor speed ($\omega_2$) | lead rotation speed ($\omega_3$) |
| --- | --- | --- | --- |
| arm fixedly maintained | $\alpha$ | $\alpha$ | 0 |
| arm operated (target speed = $\beta$) | $\beta/2 + \alpha$ | $-\beta/2 + \alpha$ | $\beta$ |

At this time, in a not-shown inverter, a resistance loss of one power transistor can be reduced to one third of that in a prior art so that thermal distribution in each of power transistors can be made substantially uniform.

Meanwhile, when the position of the movable nozzle N is changed, in other words, when the arm 31 is moved, a speed difference is caused between the first motor 25 and the second motor 26.

When a target value of the speed $\omega_3$ of the lead 22 of the ball screw 27 is, for example, $\omega_3=\beta$ as shown in Table 1, supposing that $\omega_1=\beta/2+\alpha$ and $\omega_2=-\beta/2+\alpha$, the following equation holds so that the target speed $\beta$ can be obtained.

$$\omega_3=\omega_1-\omega_2=(\beta/2+\alpha)-(-\beta/2\alpha)=\beta$$

Though in both of the two embodiments described above, the cases when the electromotive actuator according to the present invention is the electromotive actuator for use in operating the movable nozzle of the rocket are shown, the present invention is not limited to them, and the electromotive actuator according to the present invention can also be adopted as a drive source of, for example, a steering wing, an open/close hatch, an electric vehicle, and an elevator.

Figure 4:
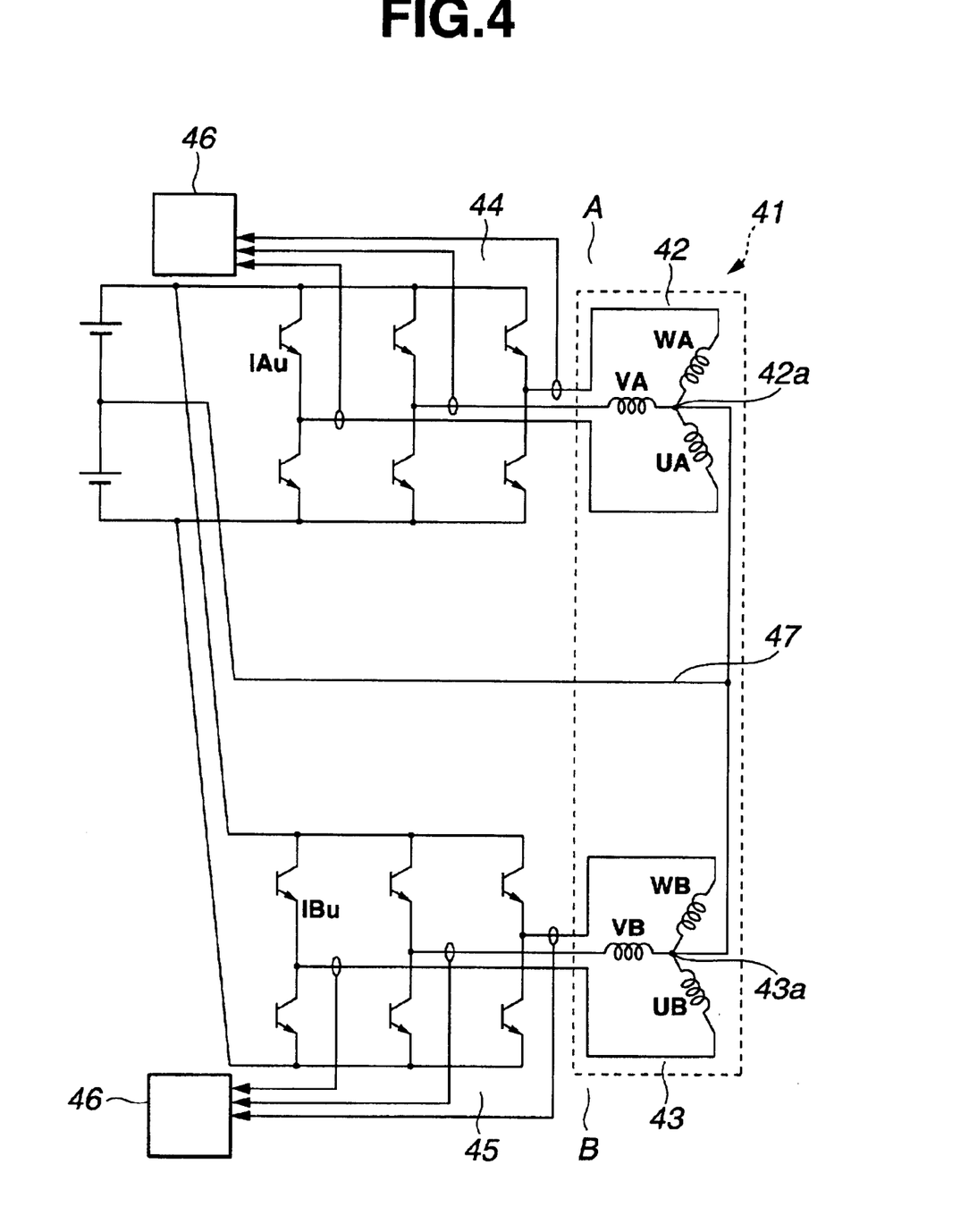
FIG. 4 is an explanatory circuit diagram showing one embodiment of a multiphase motor according to the present invention.
Figure 5:
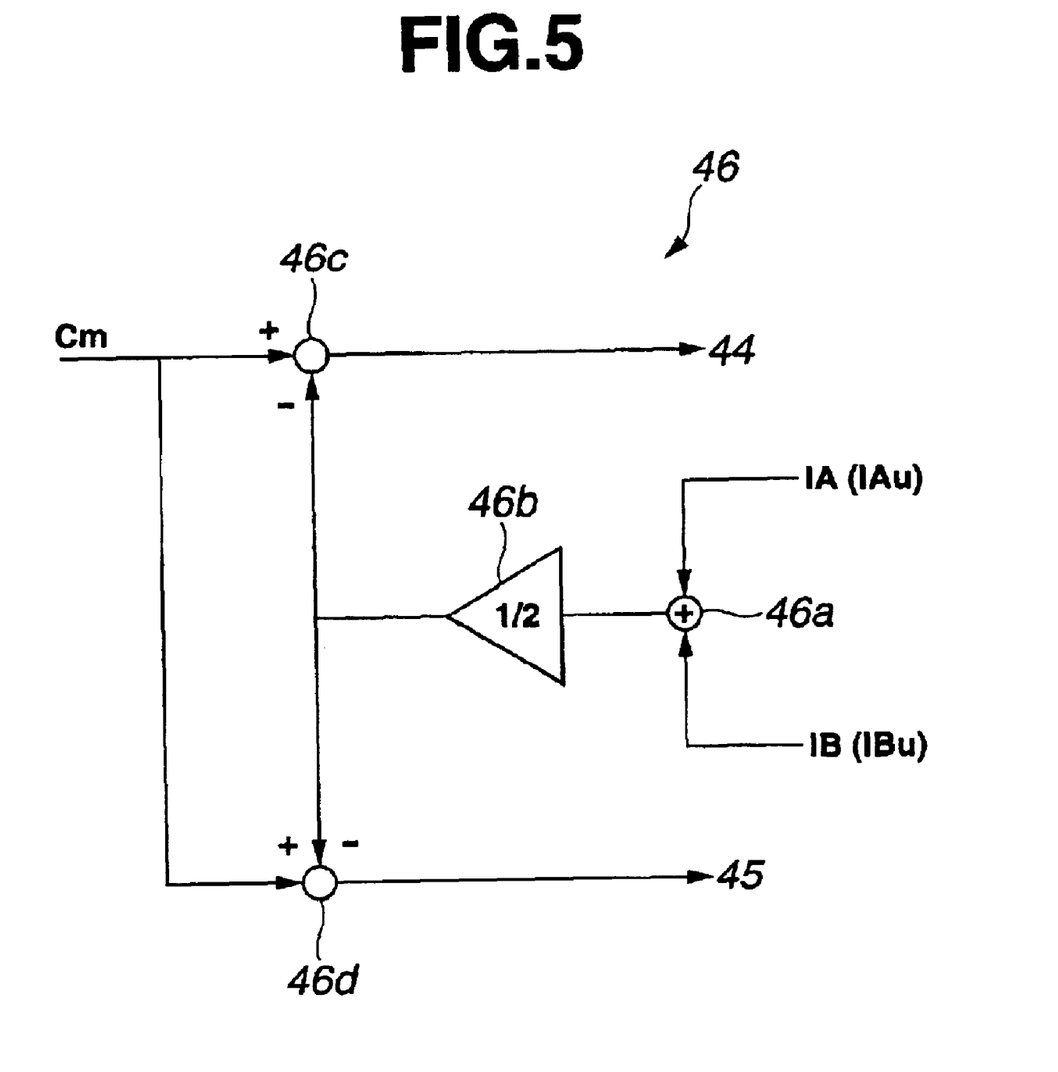
FIG. 5 is a detailed explanatory diagram of an interface circuit in FIG. 4.

FIG. 4 and FIG. 5 show one embodiment of a motor used in the electromotive actuators according to the present invention described above, namely, a multiphase motor, and a method for controlling the same according to the present invention, and in this embodiment, a case when the multiphase motor according to the present invention is a three-phase brushless motor is shown.

As shown in FIG. 4, in this three-phase brushless motor 41, which includes totally two sets of windings 42, 43 of an A system and a B system, both of these sets of the windings 42, 43 are connected to inverters 44, 45 respectively and a neutral line 47 is connected both to a neutral point 42a of a star connection in the windings 42 of the A system and a neutral point 43a of a star connection in the windings 43 of the B system.

In this case, electric currents flowing through respective phases (U-phases, V-phases, and W-phases) of the windings 42, 43 are detected by a not-shown sensor, and detected electric current signals are fedback to interface circuits 46 via the inverters 44, 45.

In the interface circuit 46, as shown in FIG. 5, after fedback electric current signals IA, IB which have flowed through the windings 42, 43 of the A system and the B system are added at an adding point 46a, a mean value of the added value is calculated in a block 46b and compared with electric current command values Cm at two adding points 46c, 46d of a comparison section respectively, and the comparison results are outputted to the inverters 44, 45 respectively.

In the three-phase brushless motor 41 described above, when, for example, a failure in a short-circuit mode occurs in the inverter 44 of the UA-phase of the windings 42 of the A system, a short-circuit electric current flows through the neutral line 47 and does not flow to other elements, and electric current control using the neutral line 47 is performed in the remaining windings 43 of the B system, so that almost no influence of the damage of the UA-phase of the windings 42 of the A system is given to the other phases.

Furthermore, in the above-described three-phase brushless motor 41, when, for example, the inverter of the UA-phase in the windings 42 of the A system is out of order, the feedback electric current signals IA (IAu), IB (IBu) which have flowed through the UA-phase and the UB-phase in the windings 42, 43 of the A system and the B system are added at the adding point 46a in the interface circuit 46, and subsequently the mean value of this added value is calculated at the block 46b and compared with the electric current command values Cm at the two adding points 46c, 46d of the comparison section respectively, and the comparison results are outputted to the inverters 44, 45 respectively.

Specifically, in the interface circuit 46, a control operation is performed in such a manner that a substantially doubled electric current signal is outputted to the inverter 45 of the B system to have the UB-phase automatically compensate for a loss in the UA-phase, so that five sixths output power or more is secured in the above-described three-phase brushless motor 41, while the output power is reduced by half in the three-phase brushless motor in the prior art in the situation described above. Therefore, the three-phase brushless motor 41 becomes best suited for use in the above-described electromotive actuators 1, 21 as a redundant motor.

Though in the above-described embodiment, the case when the multiphase motor according to the present invention is the three-phase brushless motor is shown, the present invention is not limited to this and the number of the phases and the existence and nonexistence of a brush can be appropriately selected.

The electromotive actuator according to claim 1 of the present invention has the structure previously described, thereby bringing about a highly excellent effect that high power transmission efficiency can be maintained.

The electromotive actuator according to claim 2 of the present invention has the structure previously described, so that, even when, for example, the first motor is stopped due to its failure, the drive operation can be performed only with the second motor without being influenced by the inertia load of the stopped first motor, though the speed is reduced by half, and in addition, a highly excellent effect is brought about that reliability enhancement and cost reduction can be realized since the structure is simplified.

The electromotive actuator according to claim 3 of the present invention has the structure previously described, so that not only the operating section can be operated smoothly but also the resistance loss of one power transistor can be reduced to one third of that in the prior art when the fixed state of the operating section is maintained, in other words, the thermal distribution in each of the power transistors of the inverter can be made uniform while the heat generation of the power transistors is suppressed to be small. Consequently, a highly excellent effect is brought about that not only reliability can be enhanced since the inverter is not easily damaged but also the downsizing of the inverter can be realized.

The method for controlling the electromotive actuator according to claim 4 of the present invention has the structure previously described, thereby bringing about a highly excellent effect that the fixed state of the operating section can be maintained while eliminating the concern about the damage to the inverter.

The multiphase motor according to claim 5 of the present invention has the structure previously described so that, in the case when the multiphase motor is, for example, the three-phase motor, even when a failure in the short-circuit mode occurs in the inverter of the U-phase of one of the sets of the windings, it is possible to almost eliminate the possibility that the damage of the U-phase of one of the sets of the windings influences the other phases, and in addition, a highly excellent effect is brought about that a great decrease in output power can be suppressed by performing a control operation to automatically compensate for the electric current loss in the U-phase.

The method for controlling the multiphase motor according to claim 6 has the structure previously described, thereby bringing about a highly excellent effect that, when the multiphase motor is, for example, a three-phase motor, decrease in output power can be suppressed to be small even when the inverter of the U-phase of one of the sets of the windings is malfunction.

What is claimed is:

1. An electromotive actuator, comprising:

a first motor including a rotary shaft;

a second motor including a rotary shaft; and a ball screw provided with a lead and a nut, wherein the lead of said ball screw is disposed coaxially to the rotary shaft of said first motor, and the nut of said ball screw is disposed coaxially to the rotary shaft of said second motor, thereby connecting the first motor and the second motor to each other via the ball screw.

2. The electromotive actuator according to claim 1, wherein said first motor is disposed with a lead brake for restricting the rotation of the lead of said ball screw, and said second motor is disposed with a nut brake for restricting the rotation of the nut of said ball screw.

3. A multiphase motor which is a motor used in the electromotive actuators according to claim 1, comprising:

two sets of windings connected to inverters respectively, wherein, in the multi-phase motor which performs electric current control by feeding back electric currents flowing through the two sets of the windings respectively, a neutral line connected both to a neutral point of a star connection in one of the sets of the windings and a neutral point of a star connection in the other one of the sets of the windings is provided.

4. A method for controlling a multiphase motor, wherein, in the multiphase motor according to claim 3, when a failure occurs in one of phases of one of the two sets of the windings, electric current control is performed in such a manner that a substantially doubled electric current is made to flow through a phase of the other one of the sets of the windings, which is a counterpart of the phase in which this failure occurs.

5. An electromotive actuator, comprising:

a first motor;

a second motor; and an operating section, wherein a speed adding and outputting mechanism, which is connected to both of respective rotary shafts of the first motor and the second motor, for outputting a speed difference between both of the motors to the operating section is disposed between the first motor and the second motor, and wherein the speed difference between both of the motors is eliminated by constantly rotating both of the first motor and the second motor in the same phase to enable a fixed state of the operating section to be maintained.

6. A method for controlling an electromotive actuator, wherein, in the electromotive actuator according to claim 5, the fixed state of the operating section is maintained by constantly rotating both of the first motor and the second motor in the same phase to eliminate the speed difference between both of the motors.

7. A multiphase motor which is a motor used in the electromotive actuators according to claim 5, comprising:

two sets of windings connected to inverters respectively, wherein, in the multi-phase motor which performs electric current control by feeding back electric currents flowing through the two sets of the windings respectively, a neutral line connected both to a neutral point of a star connection in one of the sets of the windings and a neutral point of a star connection in the other one of the sets of the windings is provided.

8. A method for controlling a multiphase motor, wherein, in the multiphase motor according to claim 7, when a failure occurs in one of phases of one of the two sets of the windings, electric current control is performed in such a manner that a substantially doubled electric current is made to flow through a phase of the other one of the sets of the windings, which is a counterpart of the phase in which this failure occurs.

* * * * *